US009895988B2

(12) United States Patent
Koizumi et al.

(10) Patent No.: US 9,895,988 B2
(45) Date of Patent: Feb. 20, 2018

(54) ELECTRICITY SUPPLY DEVICE, ELECTRICITY RECEPTION DEVICE, AND ELECTRICITY SUPPLY SYSTEM

(71) Applicant: PANASONIC CORPORATION, Osaka (JP)

(72) Inventors: Masayoshi Koizumi, Kanagawa (JP); Osamu Ohashi, Kanagawa (JP); Tsuyoshi Nishio, Chiba (JP); Noriaki Asaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 779 days.

(21) Appl. No.: 14/384,214

(22) PCT Filed: Mar. 13, 2013

(86) PCT No.: PCT/JP2013/001652
§ 371 (c)(1),
(2) Date: Sep. 10, 2014

(87) PCT Pub. No.: WO2013/136787
PCT Pub. Date: Sep. 19, 2013

(65) Prior Publication Data
US 2015/0084405 A1    Mar. 26, 2015

(30) Foreign Application Priority Data

Mar. 14, 2012  (JP) ................................ 2012-057152

(51) Int. Cl.
*B60L 1/00*      (2006.01)
*B60L 3/00*      (2006.01)
(Continued)

(52) U.S. Cl.
CPC ......... *B60L 11/182* (2013.01); *B60L 11/1833* (2013.01); *B60M 7/003* (2013.01);
(Continued)

(58) Field of Classification Search
CPC ...... H02J 7/00; H02J 7/02; H02J 7/025; H02J 7/042; H02J 5/00; H02J 5/005; H01F 38/14; H01F 38/16; H01F 38/00; G01R 21/14; G01R 19/00

USPC .......... 307/104, 149, 9.1, 10.1, 10.2, 66, 64; 320/108, 109; 701/22, 28, 3; 348/148, 348/146, 123; 455/255, 257
See application file for complete search history.

(56) References Cited

U.S. PATENT DOCUMENTS 8,339,097 B2 * 12/2012 Kojima ................... H02J 50/80
                                                    320/108
8,946,938 B2 *  2/2015 Kesler ................... B60L 11/182
                                                    307/104
(Continued)

FOREIGN PATENT DOCUMENTS

CN        102741083 A       10/2012
DE     10 2008 062107 A1    6/2010
(Continued)

OTHER PUBLICATIONS

Extended European Search Report for Application No. 13761323.8 dated Sep. 1, 2015.
(Continued)

*Primary Examiner* — Rexford Barnie
*Assistant Examiner* — Jagdeep Dhillon
(74) *Attorney, Agent, or Firm* — Pearne & Gordon LLP

(57) ABSTRACT

In the present invention, an electricity supply unit (103) contactlessly supplies electricity using electromagnetic induction to an electricity reception unit (153) provided to a vehicle. An electricity supply coil (103a) has a ring shape, and supplies electricity to the electricity reception unit (153) while facing the electricity reception unit (153). A casing (103b) houses the electricity supply coil (103a). The casing (103b) has an inclined section (202) that is inclined in a manner so as to approach the electricity supply coil (103a) gradually in the direction towards the outer periphery (212) of the electricity supply coil (103a) in the radial direction of the electricity supply coil (103a) at the portion at which the electricity supply coil (103a) is projected when the electric-
(Continued)

ity supply coil (103a) is projected at the casing (103b) in the direction towards the electricity reception unit (153).

12 Claims, 17 Drawing Sheets

(51) Int. Cl.
| | |
|---|---|
| *H02G 3/00* | (2006.01) |
| *B60L 11/18* | (2006.01) |
| *H02J 50/12* | (2016.01) |
| *H02J 50/60* | (2016.01) |
| *G05D 1/02* | (2006.01) |
| *B60M 7/00* | (2006.01) |
| *H02J 7/02* | (2016.01) |
| *H02J 5/00* | (2016.01) |
| *H01F 27/02* | (2006.01) |
| *H01F 38/14* | (2006.01) |

(52) U.S. Cl.
CPC ............... *G05D 1/02* (2013.01); *H01F 27/02* (2013.01); *H01F 38/14* (2013.01); *H02J 5/005* (2013.01); *H02J 7/025* (2013.01); *H02J 50/12* (2016.02); *H02J 50/60* (2016.02); *B60L 2210/30* (2013.01); *B60L 2240/36* (2013.01); *B60L 2270/147* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2011/0074346 A1 | 3/2011 | Hall et al. |
| 2011/0204845 A1 | 8/2011 | Paparo et al. |
| 2012/0112531 A1* | 5/2012 | Kesler ................... B60L 11/182 307/9.1 |
| 2012/0146580 A1* | 6/2012 | Kitamura ................ H01F 38/14 320/108 |
| 2012/0175967 A1* | 7/2012 | Dibben ................... H02J 5/005 307/104 |
| 2012/0200151 A1* | 8/2012 | Obayashi .............. B60L 11/123 307/9.1 |
| 2012/0203410 A1* | 8/2012 | Wechlin ................ B60L 11/182 701/22 |
| 2013/0094598 A1* | 4/2013 | Bastami .................. H02J 5/005 375/259 |
| 2014/0191586 A1* | 7/2014 | Ichikawa ................ H01F 38/14 307/104 |
| 2014/0340035 A1* | 11/2014 | Maekawa ............. H01F 27/365 320/108 |

FOREIGN PATENT DOCUMENTS

| | | |
|---|---|---|
| EP | 2 278 680 A1 | 1/2011 |
| JP | 06-024356 U | 3/1994 |
| JP | 06-311659 A | 11/1994 |
| JP | 2010-178499 A | 8/2010 |
| JP | 2010-226946 A | 10/2010 |
| JP | 2011-010435 A | 1/2011 |
| JP | 2012-085472 A | 4/2012 |
| JP | 2012-165498 A | 8/2012 |
| JP | 2013-135491 A | 7/2013 |
| WO | 2011/006884 A2 | 1/2011 |

OTHER PUBLICATIONS

International Search Report for Application No. PCT1JP2013/001652 dated Jun. 11, 2013.

* cited by examiner

ELECTRICITY SUPPLY DEVICE, ELECTRICITY RECEPTION DEVICE, AND ELECTRICITY SUPPLY SYSTEM

TECHNICAL FIELD

The present invention relates to an electricity supply apparatus that supplies electricity in a contactless manner using electromagnetic induction to an electricity reception section provided in a vehicle, and also relates to an electricity reception apparatus and an electricity supply system

BACKGROUND ART

Hitherto, there is known a non-contact electricity supply apparatus that is provided in the ground and that supplies electricity to an electricity reception section mounted on a vehicle (for example, Patent Literature (hereinafter, referred to as "PTL") 1).

In PTL 1, there are provided two sections including an electricity supply section and an electricity reception section. The electricity supply section houses a ring-shaped electricity supply coil and is provided at a road surface-side position where a vehicle stops in a parking space or the like. The electricity reception section houses a ring-shaped electricity reception coil and is provided on a bottom surface of a vehicle at a position facing the electricity supply section provided in the ground. A surface of a casing (a resin cover) facing the electricity reception section in the electricity supply section is formed in parallel to the radial direction of the electricity supply coil.

CITATION LIST

Patent Literature

PTL 1
Japanese Patent Application Laid-Open No. 2011-10435

SUMMARY OF INVENTION

Technical Problem

In the electricity supply apparatus of the related art, however, the surface of the casing facing the electricity reception section in the electricity supply section is parallel to the radial direction of the electricity supply coil. For this reason, many magnetic flux lines penetrate a foreign object when the foreign object exists on the surface of the casing facing the electricity reception section in the electricity supply section. Hence, a problem arises in that the foreign object is heated to a high temperature during the supply of electricity.

An object of the present invention is to provide an electricity supply apparatus, an electricity reception apparatus, and an electricity supply system capable of preventing a foreign object from being heated to a high temperature during the supply of electricity by decreasing the number of magnetic flux lines penetrating the foreign object existing on a casing surface by inclining at least a part of the casing surface facing an electricity reception section in an electricity supply section or at least a part of the casing surface facing the electricity supply section in the electricity reception section.

Solution to Problem

An electricity supply apparatus according to an aspect of the present invention is an apparatus that supplies electricity in a contactless manner using electromagnetic induction to an electricity reception section provided in a vehicle, the apparatus including: a ring-shaped electricity supply coil that faces the electricity reception section and that supplies electricity to the electricity reception section; and a casing that houses the electricity supply coil, in which the casing includes an inclined portion in a region formed when the electricity supply coil is projected to the casing in a direction toward the electricity reception section, the inclined portion inclining in such a way as to gradually approach the electricity supply coil toward an outer periphery of the electricity supply coil in a radial direction of the electricity supply coil.

An electricity reception apparatus according to an aspect of the present invention is an apparatus that is provided in a vehicle and that receives electricity from an electricity supply section, the apparatus including: a ring-shaped electricity reception coil that faces the electricity supply section and that receives electricity from the electricity supply section; and a casing that houses the electricity reception coil, in which the casing includes an inclined portion in a region formed when the electricity reception coil is projected to the casing in a direction toward the electricity supply section, the inclined portion inclining in such a way as to gradually approach the electricity reception coil toward an outer periphery of the electricity reception coil in a radial direction of the electricity reception coil.

An electricity supply system according to an aspect of the present invention includes: an electricity reception apparatus that is provided in a vehicle; and an electricity supply apparatus that supplies electricity in a contactless manner to the electricity reception apparatus, in which the electricity reception apparatus includes: a ring-shaped electricity reception coil that faces the electricity supply apparatus and that receives electricity from the electricity supply apparatus; and an electricity-reception-side casing that houses the electricity reception coil, and the electricity supply apparatus includes: a ring-shaped electricity supply coil that faces the electricity reception apparatus and that supplies electricity to the electricity reception apparatus; and an electricity-supply-side casing that houses the electricity supply coil, in which: the electricity-reception-side casing includes an electricity-reception-side inclined portion that is formed in a region formed when the electricity reception coil is projected to the electricity-reception-side casing in a direction toward the electricity supply apparatus, the electricity-reception-side inclined portion inclining in such a way as to gradually approach the electricity reception coil toward an outer periphery of the electricity reception coil in a radial direction of the electricity reception coil; and the electricity-supply-side casing includes an electricity-supply-side inclined portion that is formed in a region formed when the electricity supply coil is projected to the electricity-supply-side casing in a direction toward the electricity reception apparatus, the electricity-supply-side inclined portion inclining in such a way as to gradually approach the electricity supply coil toward an outer periphery of the electricity supply coil in a radial direction of the electricity supply coil.

Advantageous Effects of Invention

According to the present invention, it is possible to prevent the foreign object from being heated to a high temperature during the supply of electricity by decreasing the number of magnetic flux lines penetrating the foreign object existing on the casing surface by inclining at least a part of the casing surface facing the electricity reception section in the electricity supply section or at least a part of the casing surface facing the electricity supply section in the electricity reception section.

DESCRIPTION OF EMBODIMENTS

Hereinafter, embodiments of the present invention will be described in detail with reference to the drawings.

(Embodiment 1)
<Configuration of Charging System>

Figure 1:
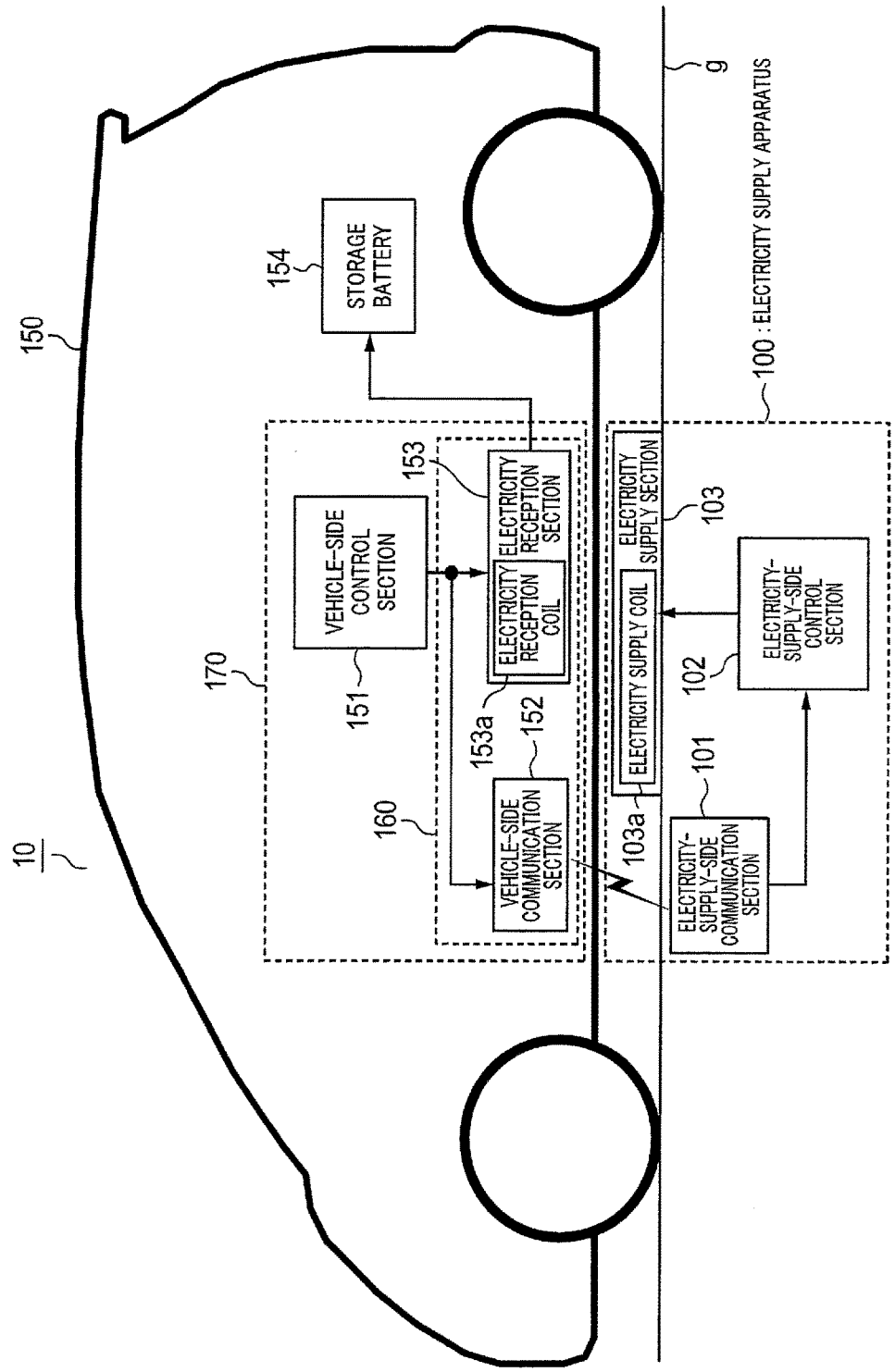
FIG. 1 is a block diagram illustrating the configuration of a charging system according to Embodiment 1 of the present invention.

FIG. 1 is a block diagram illustrating the configuration of charging system 10 of Embodiment 1 of the present invention.

Charging system 10 includes electricity supply apparatus 100, vehicle 150, storage battery 154, and charging apparatus 170.

Electricity supply apparatus 100 is installed in the ground or buried therein so that electricity supply section 103 is exposed from ground surface g. Electricity supply apparatus 100 is provided in, for example, a parking space, and supplies electricity to charging apparatus 170 while facing electricity reception section 153 in the parking state of vehicle 150. Furthermore, the configuration of electricity supply apparatus 100 will be described below.

Vehicle 150 includes storage battery 154 and charging apparatus 170, and runs on storage battery 154 as a power source. Vehicle 150 is, for example, an automobile such as an HEV (Hybrid Electric Vehicle), a PEV (Plug-in Electric Vehicle), or an EV (Electric Vehicle) that runs on the electric power of storage battery 154.

Storage battery 154 stores the electricity supplied by charging apparatus 170.

Charging apparatus 170 includes vehicle-side control section 151 and electricity reception apparatus 160, and supplies the electricity supplied from electricity supply apparatus 100 to storage battery 154. Furthermore, the detailed configuration of charging apparatus 170 will be described later.

Vehicle-side control section 151 performs a control so that various processes in accordance with a charging operation or various processes in accordance with a charging stop operation are performed on electricity reception apparatus 160.

Electricity reception apparatus 160 supplies the electricity supplied from electricity supply apparatus 100 to storage battery 154 in accordance with the control of vehicle-side control section 151. Furthermore, the configuration of electricity reception apparatus 160 will be described later.

<Configuration of Electricity Supply Apparatus>

Electricity supply apparatus 100 includes electricity-supply-side communication section 101, electricity-supply-side control section 102, and electricity supply section 103.

Electricity-supply-side communication section 101 receives an electricity supply start signal or an electricity supply stop signal from vehicle-side communication section 152. Electricity-supply-side communication section 101 outputs the received electricity supply start signal or the received electricity supply stop signal to electricity-supply-side control section 102.

Electricity-supply-side control section 102 performs a control so that the supply of electricity to electricity supply section 103 starts in accordance with the electricity supply start signal input from electricity-supply-side communication section 101. Electricity-supply-side control section 102 performs a control so that the supply of electricity to electricity supply section 103 stops in accordance with the electricity supply stop signal input from electricity-supply-side communication section 101.

Electricity supply section 103 includes electricity supply coil 103a. Electricity supply section 103 supplies electricity to electricity reception section 153 using electromagnetic induction in a manner such that a current of a predetermined frequency is supplied to electricity supply coil 103a in accordance with the control of electricity-supply-side control section 102. The supply of electricity is performed by, for example, an electromagnetic induction method or a magnetic resonance method. Furthermore, the detailed configuration of electricity supply section 103 will be described later.

<Configuration of Electricity Reception Apparatus>

Electricity reception apparatus 160 includes vehicle-side communication section 152 and electricity reception section 153.

Vehicle-side communication section 152 generates a charging start signal or a charging stop signal in accordance with the control of vehicle-side control section 151, and transmits the generated charging start signal or the generated charging stop signal to electricity-supply-side communication section 101.

Electricity reception section 153 is provided at the bottom portion of vehicle 150, includes electricity reception coil 153a, and faces electricity supply section 103 in a non-contact state when storage battery 154 is charged. Electricity reception section 153 supplies the electricity supplied from electricity supply section 103 to electricity reception coil 153a to storage battery 154 in accordance with the control of vehicle-side control section 151.

<Configuration of Electricity Supply Section>

Figure 2:
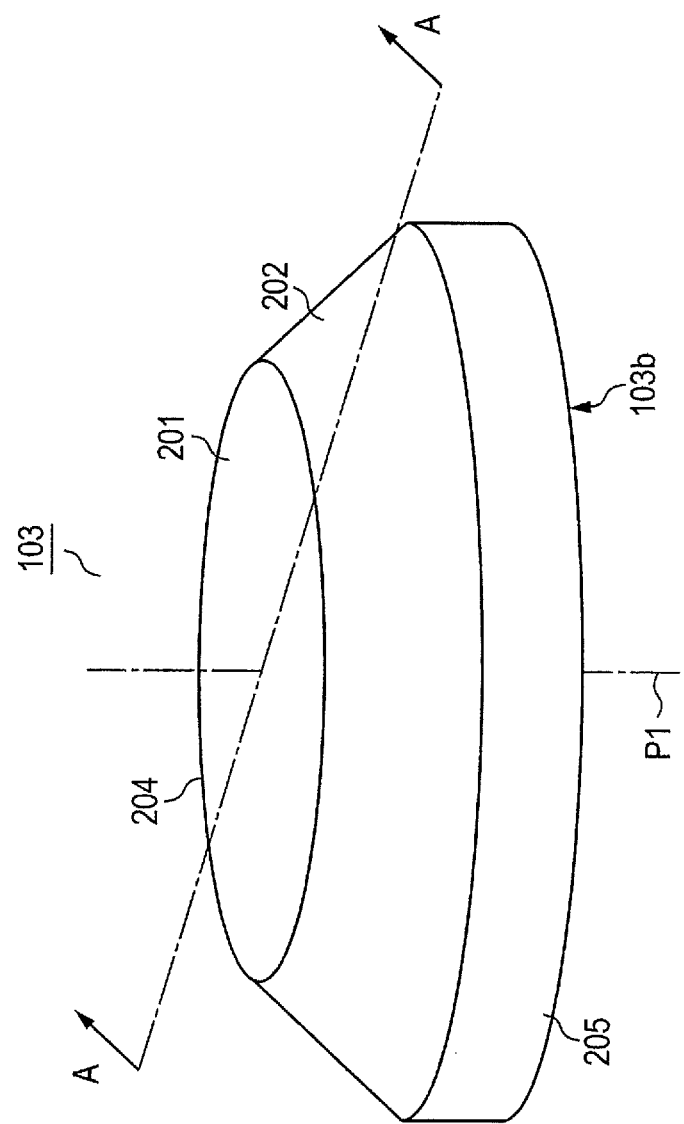
FIG. 2 is a perspective view illustrating an electricity supply section according to Embodiment 1 of the present invention.
Figure 3:
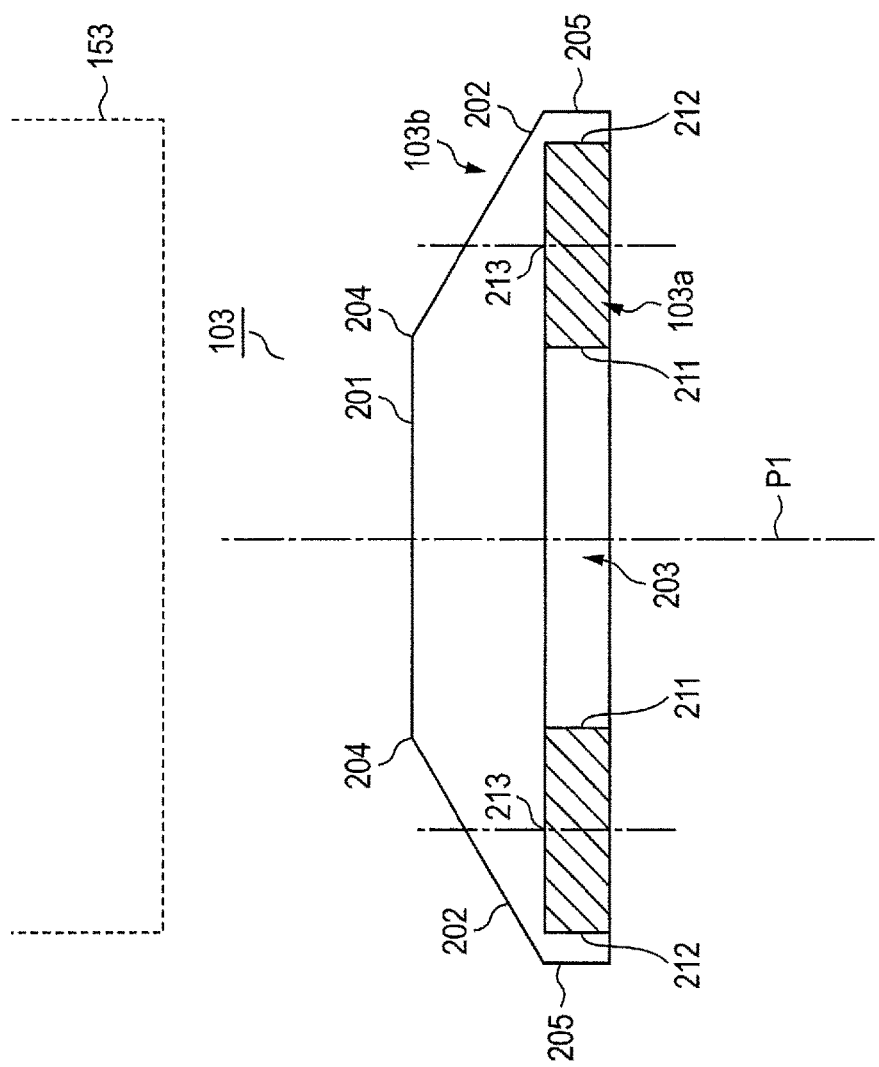
FIG. 3 is a cross-sectional view taken along the line A-A of FIG. 2.

FIG. 2 is a perspective view of electricity supply section 103. FIG. 3 is a cross-sectional view taken along the line A-A of FIG. 2.

Electricity supply section 103 includes electricity supply coil 103a (see FIG. 3) and casing 103b.

Electricity supply coil 103a has a hollow ring shape, and is disposed on the bottom surface of casing 103b. Electricity supply coil 103a is connected to, for example, a general power supply, and supplies electricity to electricity reception section 153 by the current supplied from the power supply. Electricity supply coil 103a is formed by winding, for example, a thin metal wire.

As illustrated in FIG. 3, casing 103b has a trapezoid cross-section (a cross-section taken along the line A-A of FIG. 2) cut in a plane including center axis P1, and houses electricity supply coil 103a. Casing 103b includes flat portion 201 and inclined portion 202. Casing 103b includes inclined portion 202 in a region formed when electricity supply coil 103a is projected to casing 103b in a direction toward electricity reception section 153.

Flat portion 201 faces hollow portion 203 of electricity supply coil 103a and is formed so as to intersect center axis P1 of electricity supply coil 103a and to be flat in the radial direction of electricity supply coil 103a. Flat portion 201 faces electricity reception section 153 during the supply of electricity.

Inclined portion 202 is provided in casing 103b, and is formed so as to have an inclination in which the inclined portion is inclined downward from end 204 of flat portion 201 toward outer periphery 212 of electricity supply coil 103a in the radial direction of electricity supply coil 103a, that is, the inclined portion gradually approaches electricity supply coil 103a. Here, the radial direction of electricity supply coil 103a indicates the direction perpendicular to center axis P1 of electricity supply coil 103a. Inclined portion 202 is formed so that one end thereof is connected to end 204 of flat portion 201 and the other end thereof is connected to side wall portion 205. Accordingly, a foreign object existing on inclined portion 202 is inclined by a predetermined angle with respect to the radial direction of electricity supply coil 103a. As a result, it is possible to prevent the foreign object on inclined portion 202 from being heated to a high temperature during the supply of electricity. Furthermore, the reason why the foreign object on inclined portion 202 is not easily heated will be described later.

In the embodiment, however, since a large amount of electricity is supplied to electricity reception section 153 of the bottom portion of vehicle 150, electricity supply coil 103a has a large shape, and hence an enough curved surface may not be provided in casing 103b of electricity supply section 103 due to the relation in clearance between electricity supply section 103 and the bottom portion of vehicle 150. For this reason, it is difficult to form a convex inclined surface from which the foreign object on casing 103b naturally drops. Thus, when inclined portion 202 and flat portion 201 are formed at the portions facing electricity reception section 153 in casing 103b of electricity supply section 103 as in the embodiment, an inclined surface does not need to be provided in the entire portion facing electricity reception section 153 of casing 103b of electricity supply section 103 and an increase in height in a direction toward the bottom surface of vehicle 150 is suppressed, so that the clearance between electricity supply section 103 and the bottom portion of vehicle 150 can be maintained.

<Relation Between Casing and Magnetic Flux>

Figure 4:
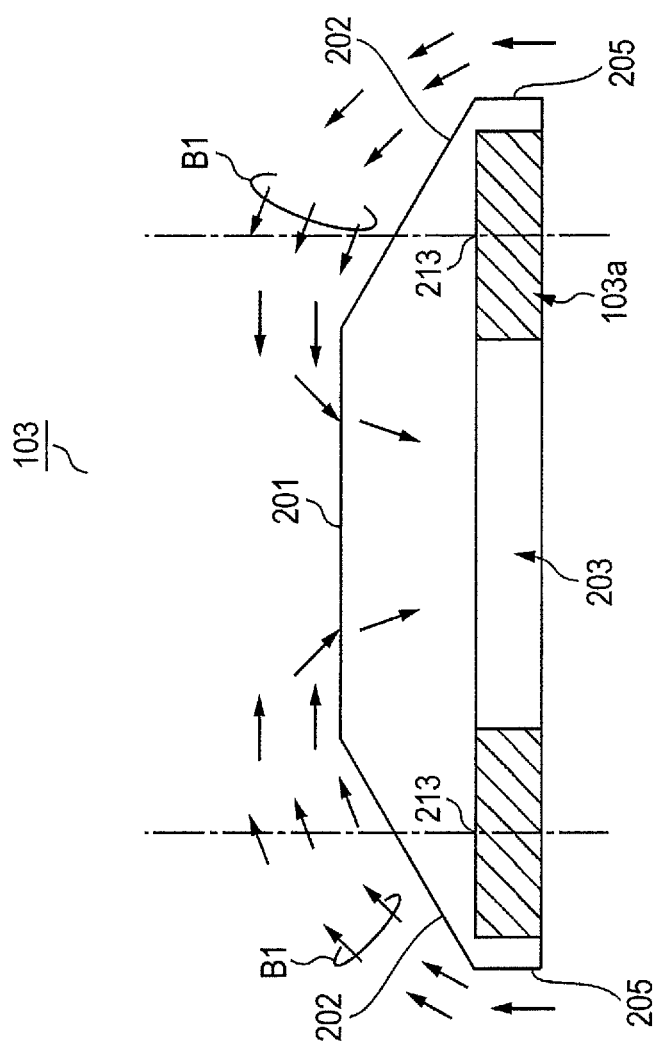
FIG. 4 is a view illustrating how a magnetic flux is generated from an electricity supply coil of Embodiment 1 of the present invention.
Figure 5:
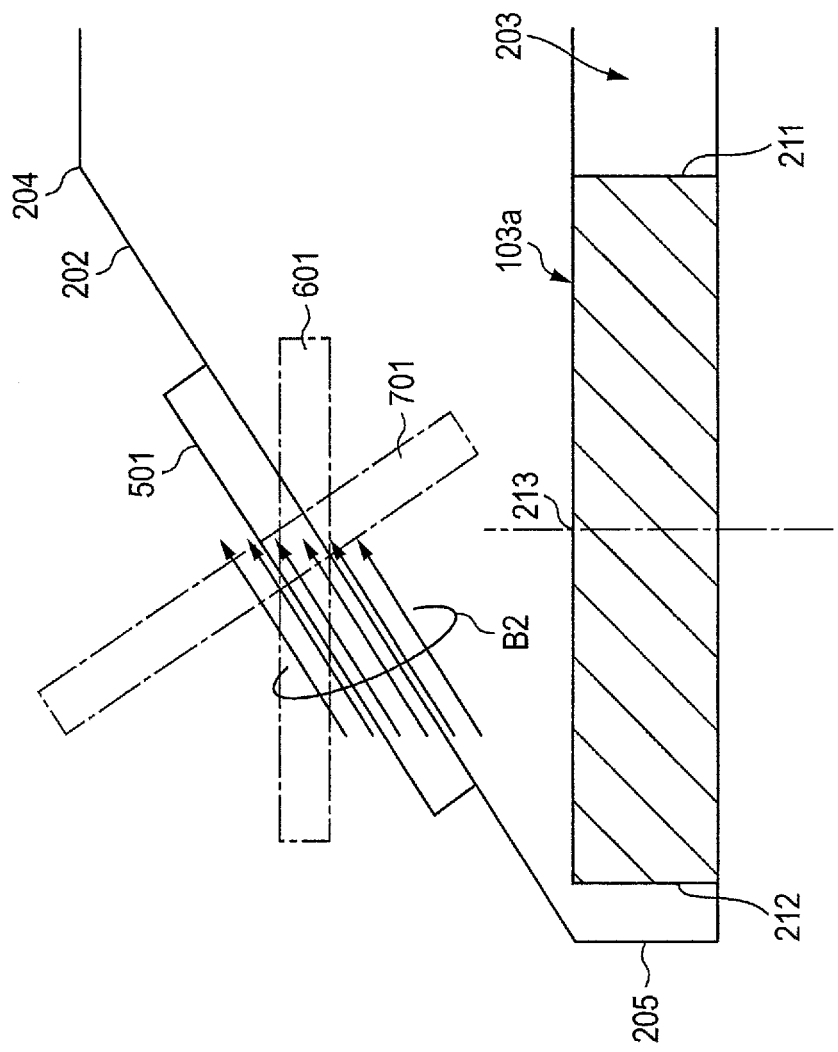
FIG. 5 is a diagram illustrating the state of a magnetic flux in an inclined portion of a casing of Embodiment 1 of the present invention.
Figure 6:
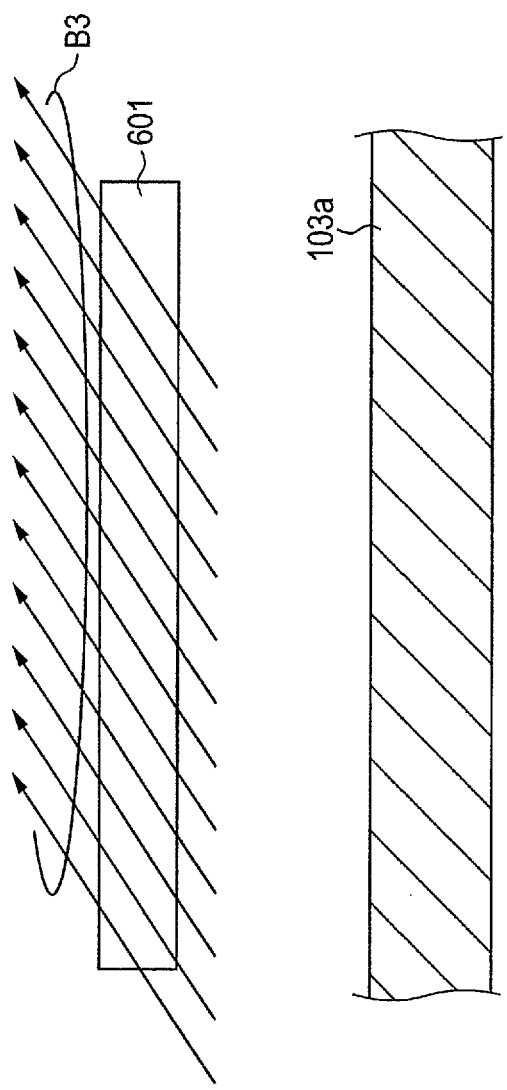
FIG. 6 is a diagram illustrating the state of a magnetic flux in the case where a flat portion is provided instead of the inclined portion of Embodiment 1 of the present invention.
Figure 7:
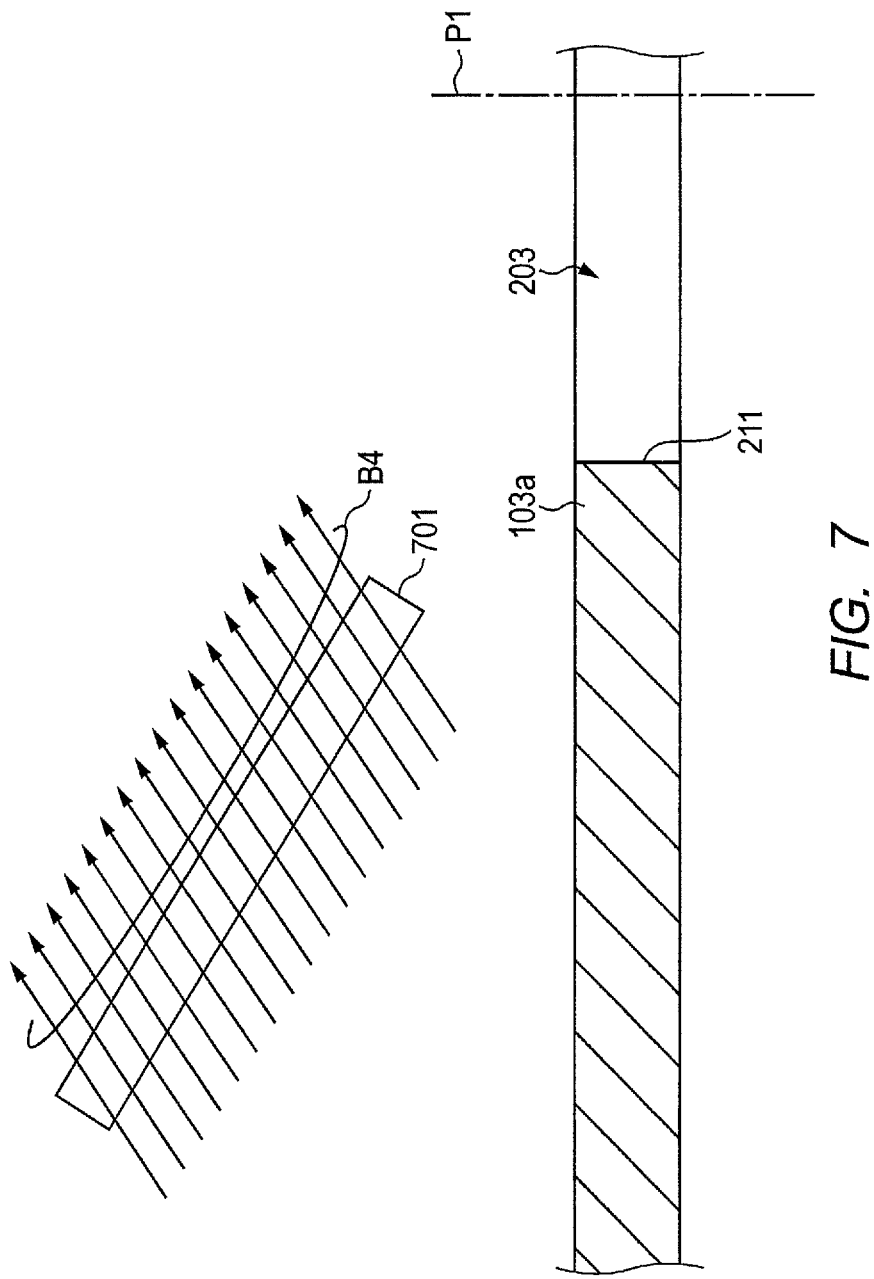
FIG. 7 is a diagram illustrating the state of a magnetic flux in the case where an inclined portion that inclines in a direction opposite to the inclined portion of Embodiment 1 is provided instead of the inclined portion of Embodiment 1 of the present invention.

FIG. 4 is a diagram illustrating how a magnetic flux is generated from electricity supply coil 103a of the embodiment. FIG. 5 is a diagram illustrating the state of a magnetic flux of inclined portion 202 of casing 103b of the embodiment. FIG. 6 is a diagram illustrating the state of a magnetic flux in the case where a flat portion is provided instead of inclined portion 202 of the embodiment. FIG. 7 is a diagram illustrating the state of a magnetic flux in the case where an inclined portion is provided in such a way as to incline in a direction opposite to inclined portion 202 of the embodiment instead of inclined portion 202 of the embodiment.

As the comparison with the case where foreign object 501 exists on inclined portion 202 of the embodiment in FIG. 5, foreign object 601 existing on a casing of a shape illustrated in FIG. 6 and foreign object 701 existing on a casing of a shape illustrated in FIG. 7 are indicated by the dashed line.

In the embodiment, as illustrated in FIG. 4, magnetic flux B1 is generated by electricity supply coil 103a. At this time, as illustrated in FIG. 5, foreign object 501 on inclined portion 202 of casing 103b becomes parallel to generated magnetic flux lines B2, and the number of the magnetic flux lines penetrating foreign object 501 can be limited. Accordingly, it is possible to prevent the temperature of foreign object 501 from becoming a high temperature during the supply of electricity.

Meanwhile, when the entire surface facing electricity reception section 153 in the casing of the electricity supply section is formed as a flat portion which is flat in the radial direction of electricity supply coil 103a as illustrated in FIG. 6 or an inclined portion is formed in such a way as to gradually approach electricity supply coil 103a from outer periphery 212 of electricity supply coil 103a toward center axis P1 of electricity supply coil 103a as illustrated in FIG. 7 instead of inclined portion 202, the number of magnetic flux lines B3 and B4 penetrating foreign objects 601 and 701 on the casing increases compared to FIG. 5.

For that reason, the temperature of the foreign object on the casing does not become a high temperature in FIG. 5 compared to FIGS. 6 and 7.

Further, it is desirable that inclined portion 202 face middle portion 213 between inner edge 211 and outer periphery 212 of hollow portion 203 in electricity supply coil 103a. The reason is that the heat radiation amount in the portion facing middle portion 213 becomes smaller than that of the other portion because the foreign object becomes parallel to the magnetic flux generated by the coil and the interlinked magnetic flux amount decreases.

<Relation Between Temperature of Foreign Object on Casing of Electricity Supply Section and Time>

Figure 8:
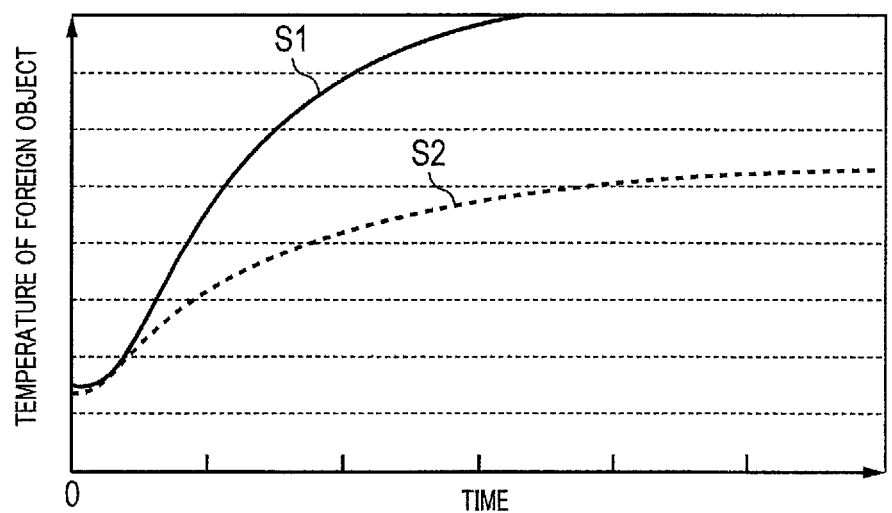
FIG. 8 is a diagram illustrating a relation between the temperature of a foreign object existing on the casing of the electricity supply section facing the electricity reception section of Embodiment 1 of the present invention during electricity supply and a time.

FIG. 8 is a diagram illustrating a relation between the temperature of the foreign object existing on the casing of the electricity supply section facing the electricity reception section during the supply of electricity and a time. In FIG. 8, reference numeral S1 indicates the temporal transition of the temperature change of the foreign object on the casing having the shape illustrated in FIG. 6 without having the inclined portion, and reference numeral S2 indicates the temporal transition of the temperature change of the foreign object on inclined portion 202 of the embodiment.

In the embodiment, it is obvious that an increase in the temperature of the foreign object can be suppressed compared to the related art according to FIG. 8.

<Effect of Embodiment 1>

According to the embodiment, since the inclined portion which inclines in such a way as to gradually approach the outer periphery of the electricity supply coil in the radial direction of the electricity supply coil is formed in a region formed when the electricity supply coil is projected to the casing in a direction toward the electricity reception section, it is possible to prevent the foreign object existing on the inclined portion from being heated to a high temperature during the supply of electricity.

Further, according to the embodiment, since the inclined portion and the flat portion are formed at a portion facing the electricity reception section in the casing of the electricity supply section, a curved surface does not need to be provided in the entire portion facing the electricity reception section in the casing of the electricity supply section and an increase in height in a direction toward the bottom surface of the vehicle is suppressed, so that the clearance between the electricity supply section and the bottom surface of the vehicle may be maintained.

(Embodiment 2)

In the embodiment, since a charging system has the same configuration as FIG. 1 except that electricity supply section 400 is used instead of electricity supply section 103, the description thereof will not be repeated.

<Configuration of Electricity Supply Section>

Figure 9:
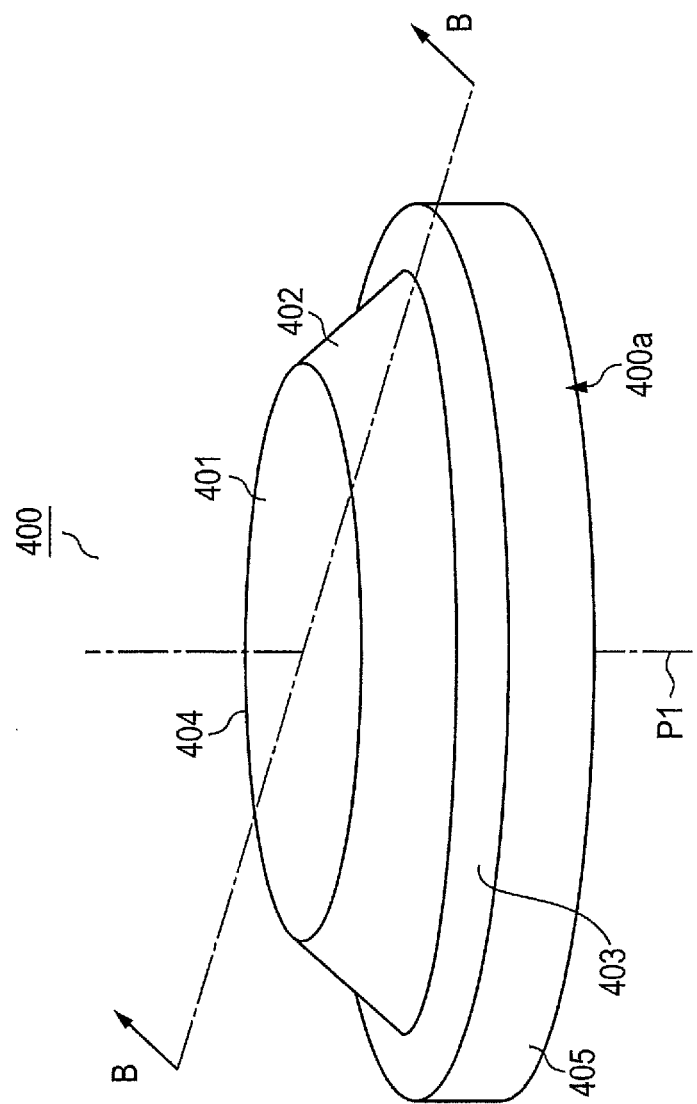
FIG. 9 is a perspective view illustrating an electricity supply section according to Embodiment 2 of the present invention.
Figure 10:
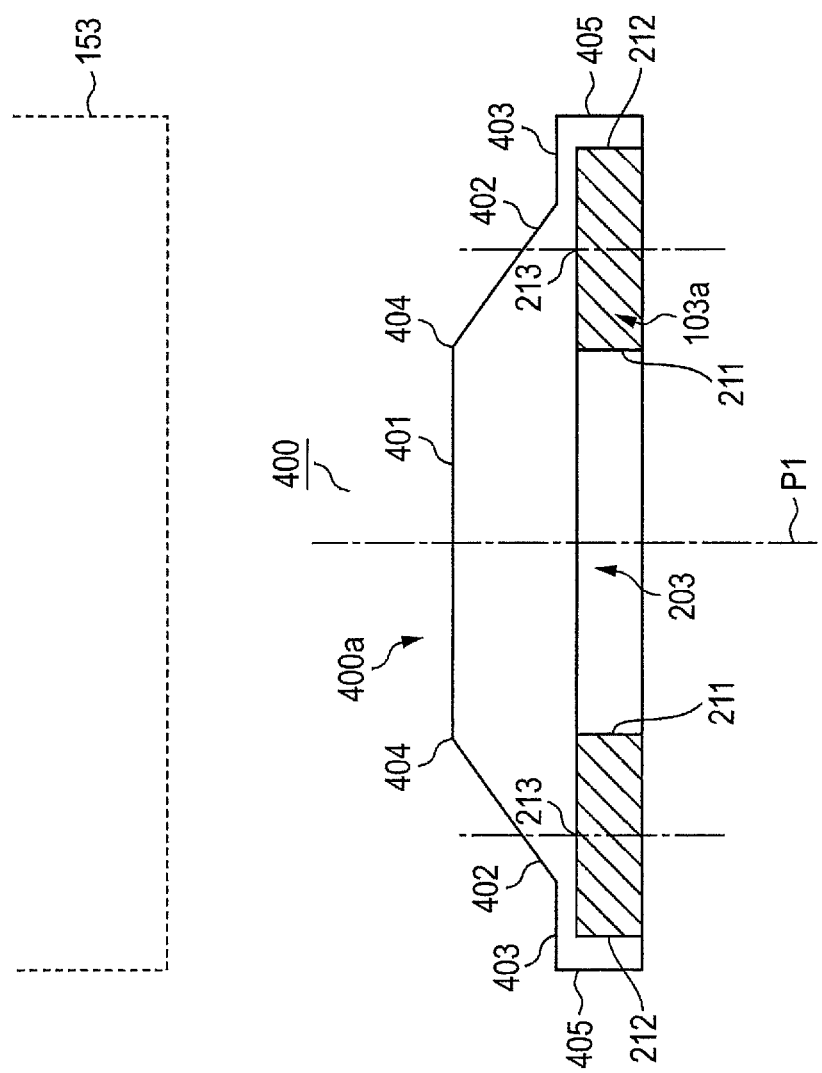
FIG. 10 is a cross-sectional view taken along the line B-B of FIG. 9.

FIG. 9 is a perspective view of electricity supply section 400. FIG. 10 is a cross-sectional view taken along the line B-B of FIG. 9. Furthermore, in FIGS. 9 and 10, the same reference numerals will be given to the same components as those of FIGS. 2 and 3, and the description thereof will not be repeated.

Electricity supply section 400 includes electricity supply coil 103a (see FIG. 10) and casing 400a.

Electricity supply coil 103a has a hollow ring shape, and is disposed on the bottom surface of casing 400a.

As illustrated in FIG. 10, casing 400a has a trapezoid cross-section (a cross-section taken along the line B-B of FIG. 9) cut in a plane including center axis P1, and houses electricity supply coil 103a. Casing 400a includes flat portion 401, inclined portion 402, and outer peripheral portion 403. Casing 400a includes inclined portion 402 in a region formed when electricity supply coil 103a is projected to casing 400a in a direction toward electricity reception section 153.

Flat portion 401 faces hollow portion 203 of electricity supply coil 103a and is formed so as to intersect center axis P1 of electricity supply coil 103a and to be flat in the radial direction of electricity supply coil 103a. Flat portion 401 faces electricity reception section 153 during the supply of electricity.

Inclined portion 402 is provided in casing 400a, and is formed in such a way as to incline downward from end 404 of flat portion 401 toward outer periphery 212 of electricity supply coil 103a in the radial direction of electricity supply coil 103a, that is, the inclined portion gradually approaches electricity supply coil 103a. Accordingly, a foreign object existing on inclined portion 402 is inclined by a predetermined angle with respect to the radial direction of electricity supply coil 103a. As a result, it is possible to prevent the foreign object existing on inclined portion 402 from being heated to a high temperature during the supply of electricity for the same reason as Embodiment 1.

Outer peripheral portion 403 is flat in the radial direction of electricity supply coil 103a, and is formed so that one end thereof is connected to inclined portion 402 and the other end thereof is connected to side wall portion 405 of casing 400a. A portion connected to inclined portion 402 in outer peripheral portion 403 faces electricity supply coil 103a. Outer peripheral portion 403 faces electricity reception section 153 during the supply of electricity.

Furthermore, it is desirable that inclined portion 402 face middle portion 213 of electricity supply coil 103a for the same reason as Embodiment 1.

<Effect of Embodiment 2>

According to the embodiment, the outer peripheral portion is provided in the end of the electricity supply coil so as to be flat in the radial direction in addition to the effect of Embodiment 1. Accordingly, since the length of the inclined portion can be shortened, the thickness of the casing can be reduced by the shortened length and the radiation of the heat of the foreign object on the inclined portion is suppressed, so that the clearance with respect to the vehicle body may be sufficiently set.

(Embodiment 3)

In the embodiment, since a charging system has the same configuration as FIG. 1 except that electricity supply section 500 is used instead of electricity supply section 103, the description thereof will not be repeated.

<Configuration of Electricity Supply Section>

Figure 11:
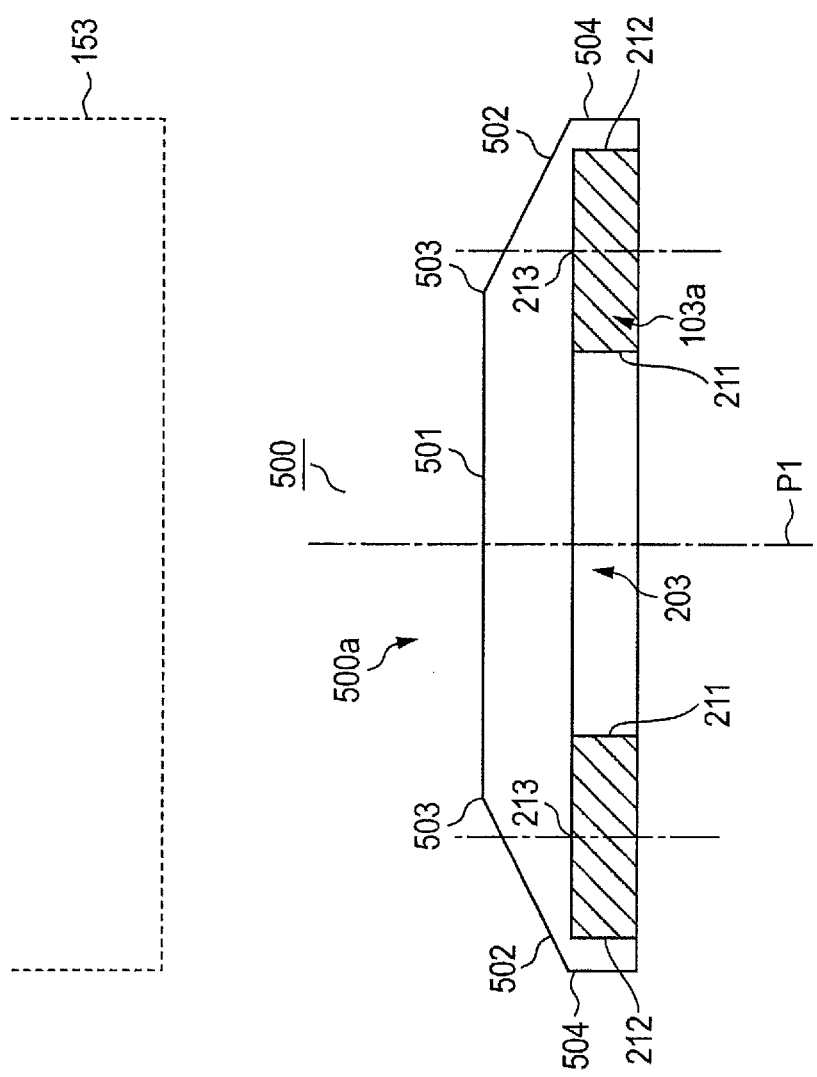
FIG. 11 is a cross-sectional view illustrating an electricity supply section according to Embodiment 3 of the present invention.

FIG. 11 is a cross-sectional view of electricity supply section 500. Furthermore, in FIG. 11, the same reference numerals will be given to the same components as those of FIG. 3, and the description thereof will not be repeated. Further, since the shape of electricity supply section 500 is the same as that of FIG. 2 except that the dimensions of flat portion 501, inclined portion 502, and side wall portion 504 are slightly different, the perspective view of electricity supply section 500 will be omitted. Further, FIG. 11 is a cross-sectional view obtained when electricity supply section 500 is cut along the line corresponding to the line A-A of FIG. 2.

Electricity supply section 500 includes electricity supply coil 103a and casing 500a.

Electricity supply coil 103a has a hollow ring shape, and is disposed on the bottom surface of casing 500a.

As illustrated in FIG. 11, casing 500a has a trapezoid cross-section cut in a plane including center axis P1, and houses electricity supply coil 103a. Casing 500a includes flat portion 501 and inclined portion 502. Casing 500a includes inclined portion 502 in a region formed when electricity supply coil 103a is projected to casing 500a in a direction toward electricity reception section 153.

In flat portion 501, the center portion faces hollow portion 203 of electricity supply coil 103a, and end 503 faces electricity supply coil 103*a*. Flat portion 501 is formed so as to intersect center axis P1 of electricity supply coil 103*a* and to be flat in the radial direction of electricity supply coil 103*a*. Flat portion 501 faces electricity reception section 153 during the supply of electricity.

Inclined portion 502 is provided in casing 500*a*, and is formed in such a way as to incline downward from end 503 of flat portion 501 toward outer periphery 212 of electricity supply coil 103*a* in the radial direction of electricity supply coil 103*a*, that is, the inclined portion gradually approaches electricity supply coil 103*a*. Inclined portion 502 is formed so that one end thereof is connected to end 503 of flat portion 501 and the other end thereof is connected to side wall portion 504. Accordingly, a foreign object existing on inclined portion 502 is inclined by a predetermined angle with respect to the radial direction of electricity supply coil 103*a*. As a result, it is possible to prevent the foreign object existing on inclined portion 502 from being heated to a high temperature during the supply of electricity for the same reason as Embodiment 1.

Furthermore, it is desirable that inclined portion 502 face middle portion 213 of electricity supply coil 103*a* for the same reason as Embodiment 1.

<Effect of Embodiment 3>

According to the embodiment, the flat portion is formed so that the end of the inner surface of the flat portion faces the electricity supply coil. Accordingly, since the length of the inclined portion may be shortened while suppressing the radiation of heat in the middle portion where the foreign object on the inclined portion easily radiates heat, the thickness of the casing may be reduced and the clearance with respect to the vehicle body may be maintained in addition to the effect of Embodiment 1.

(Embodiment 4)

Figure 12:
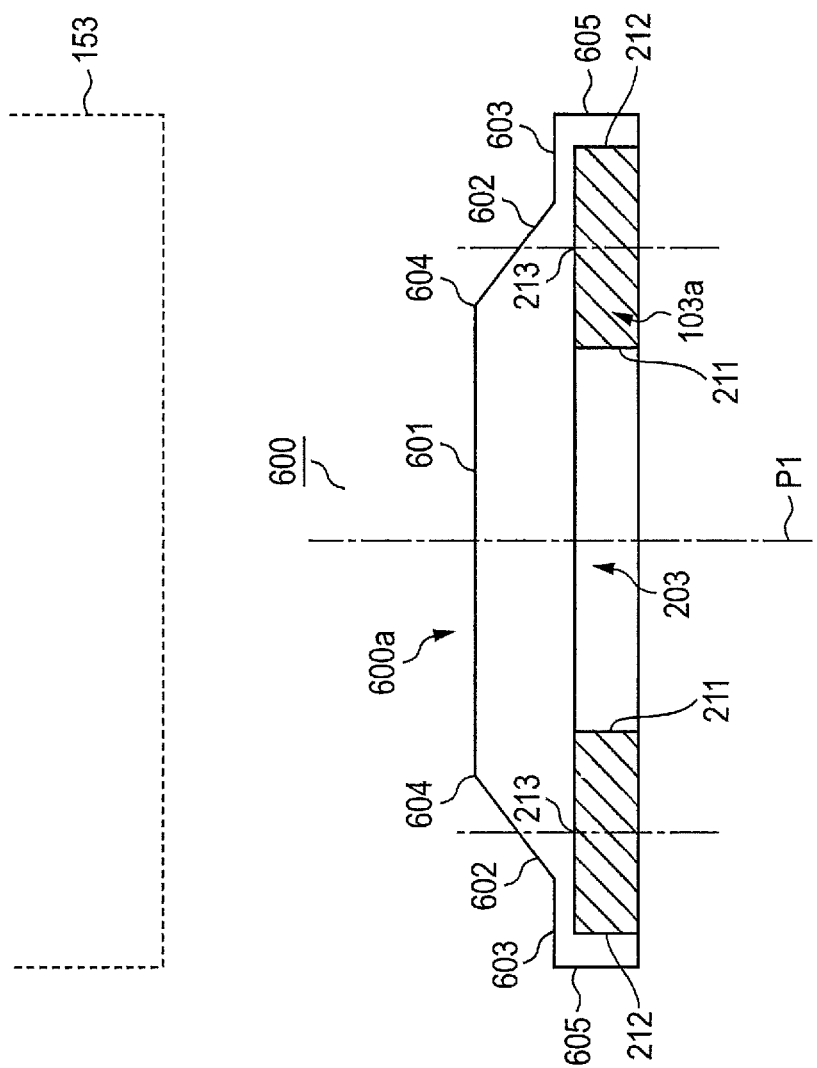
FIG. 12 is a cross-sectional view illustrating an electricity supply section according to Embodiment 4 of the present invention.

FIG. 12 is a cross-sectional view of electricity supply section 600. Furthermore, in FIG. 12, the same reference numerals will be given to the same components as those of FIG. 3, and the description thereof will not be repeated. Further, since the shape of electricity supply section 600 is the same as that of FIG. 9 except that the dimensions of flat portion 601, inclined portion 602, flat portion 603, and side wall portion 605 are slightly different, the perspective view of electricity supply section 600 will be omitted. Further, FIG. 12 is a cross-sectional view obtained when electricity supply section 600 is cut along the line corresponding to the line B-B of FIG. 9.

Electricity supply section 600 includes electricity supply coil 103*a* and casing 600*a*.

Electricity supply coil 103*a* has a hollow ring shape, and is disposed on the bottom surface of casing 600*a*.

As illustrated in FIG. 12, casing 600*a* has a trapezoid cross-section cut in a plane including center axis P1, and houses electricity supply coil 103*a*. Casing 600*a* includes flat portion 601, inclined portion 602, and outer peripheral portion 603. Casing 600*a* includes inclined portion 602 in a region formed when electricity supply coil 103*a* is projected to casing 600*a* in a direction toward electricity reception section 153.

In flat portion 601, the center portion faces hollow portion 203 of electricity supply coil 103*a*, and end 604 faces electricity supply coil 103*a*. Flat portion 601 is formed so as to intersect center axis P1 of electricity supply coil 103*a* and to be flat in the radial direction of electricity supply coil 103*a*. Flat portion 601 faces electricity reception section 153 during the supply of electricity.

Inclined portion 602 is provided in casing 600*a*, and is formed in such a way as to incline downward from end 604 of flat portion 601 toward outer periphery 212 of electricity supply coil 103*a* in the radial direction of electricity supply coil 103*a*, that is, the inclined portion gradually approaches electricity supply coil 103*a*. Inclined portion 602 is formed so that one end thereof is connected to end 604 of flat portion 601 and the other end thereof is connected to outer peripheral portion 603. Accordingly, a foreign object existing on inclined portion 602 is inclined by a predetermined angle with respect to electricity supply coil 103*a*. As a result, it is possible to prevent the foreign object on inclined portion 602 from being heated to a high temperature during the supply of electricity for the same reason as Embodiment 1.

Outer peripheral portion 603 is flat in the radial direction of electricity supply coil 103*a*, and is formed so that one end thereof is connected to inclined portion 602 and the other end thereof is connected to side wall portion 605. A portion connected to inclined portion 602 in outer peripheral portion 603 faces electricity supply coil 103*a*. Outer peripheral portion 603 faces electricity reception section 153 during the supply of electricity.

Furthermore, it is desirable that inclined portion 602 faces middle portion 213 of electricity supply coil 103*a* for the same reason as Embodiment 1.

<Effect of Embodiment 4>

According to the embodiment, the outer peripheral portion is provided so as to be flat in the radial direction of the electricity supply coil, and the flat portion is formed so that the end of the inner surface of the flat portion faces the electricity supply coil. Accordingly, since the length of the inclined portion can be shortened while suppressing the radiation of heat in the middle portion where the foreign object on the inclined portion easily radiates heat, the thickness of the casing may be reduced and the clearance with respect to the vehicle body may be maintained in addition to the effect of Embodiment 1.

(Embodiment 5)

Figure 13:
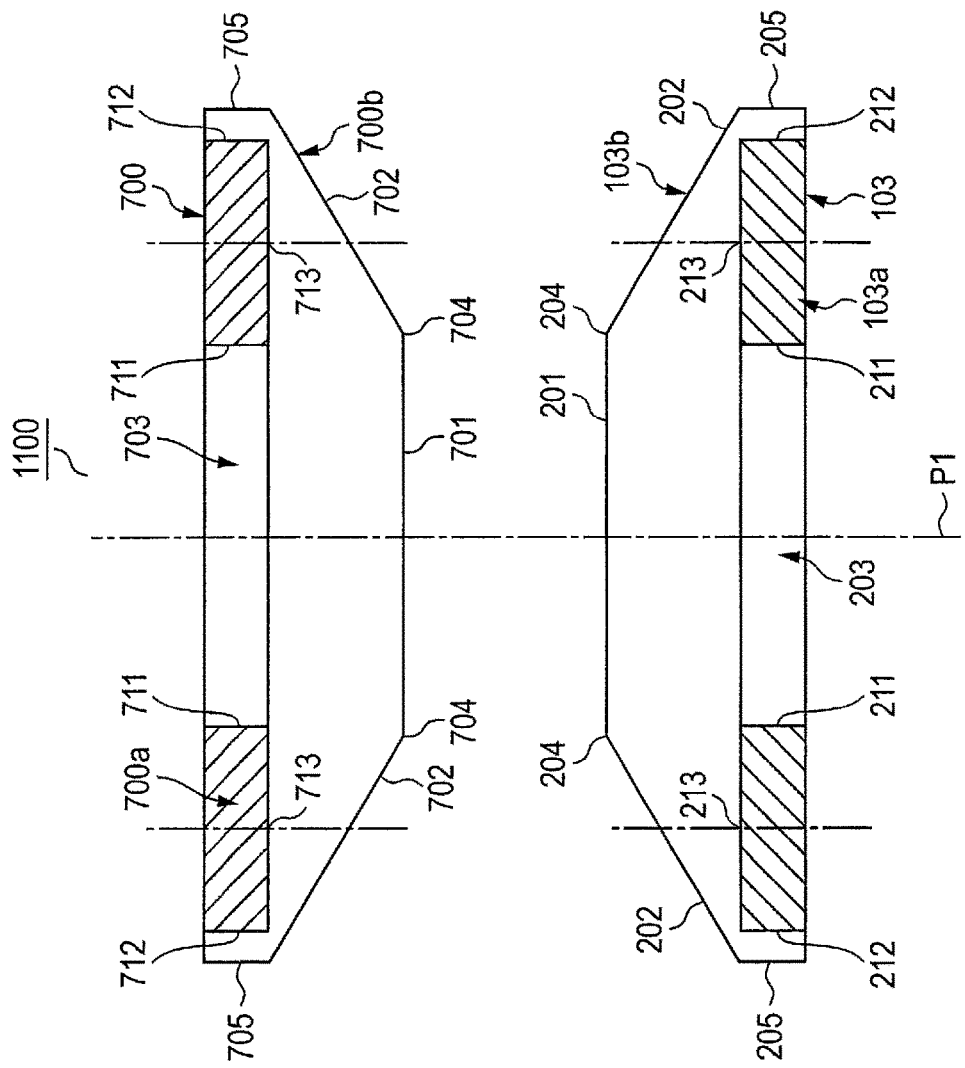
FIG. 13 is a view illustrating the configuration of an electricity supply system according to Embodiment 5 of the present invention.

FIG. 13 is a view illustrating the configuration of electricity supply system 1100 according to Embodiment 5 of the present invention. Furthermore, in FIG. 13, the same reference numerals will be given to the same components as those of FIGS. 2 and 3, and the description thereof will not be repeated. Further, since a charging system of the embodiment has the same configuration as FIG. 1 except that electricity reception section 700 is used instead of electricity reception section 153, the description thereof will not be repeated.

<Configuration of Electricity Reception Section>

Electricity reception section 700 includes electricity reception coil 700*a* and casing 700*b*.

Electricity reception coil 700*a* has a hollow ring shape, and is housed in casing 700*b* while contacting the inside ceiling surface of casing 700*b*. Electricity reception coil 700*a* is formed by winding, for example, a thin metal wire.

As illustrated in FIG. 13, casing 700*b* has a trapezoid cross-section cut in a plane including center axis P1, and houses electricity reception coil 700*a*. Casing 700*b* includes flat portion 701 and inclined portion 702. Casing 700*b* includes inclined portion 702 in a region formed when electricity reception coil 700*a* is projected to casing 700*b* in a direction toward electricity supply section 103.

Flat portion 701 faces hollow portion 703 of electricity reception coil 700*a* and is formed so as to intersect center axis P1 of electricity reception coil 700*a* and to be flat in the radial direction of electricity reception coil 700*a* (a direction perpendicular to center axis P1). Flat portion 701 faces electricity supply section 103 during the supply of electricity.

Inclined portion 702 is provided in casing 700b and is formed in such a way as to gradually approach electricity reception coil 700a from end 704 of flat portion 701 toward outer periphery 712 of electricity reception coil 700a in the radial direction of electricity reception coil 700a. Inclined portion 702 is formed so that one end thereof is connected to end 704 of flat portion 701 and the other end thereof is connected to side wall portion 705.

Further, it is desirable that inclined portion 702 face middle portion 713 between inner edge 711 and outer periphery 712 around hollow portion 703 in electricity reception coil 700a. The reason is that the heat radiation amount in the portion facing middle portion 713 becomes smaller than that of the other portion because the foreign object becomes parallel to the magnetic flux generated by the coil and the interlinked magnetic flux amount decreases.

<Regarding Radiation of Heat of Foreign Object>

Figure 14:
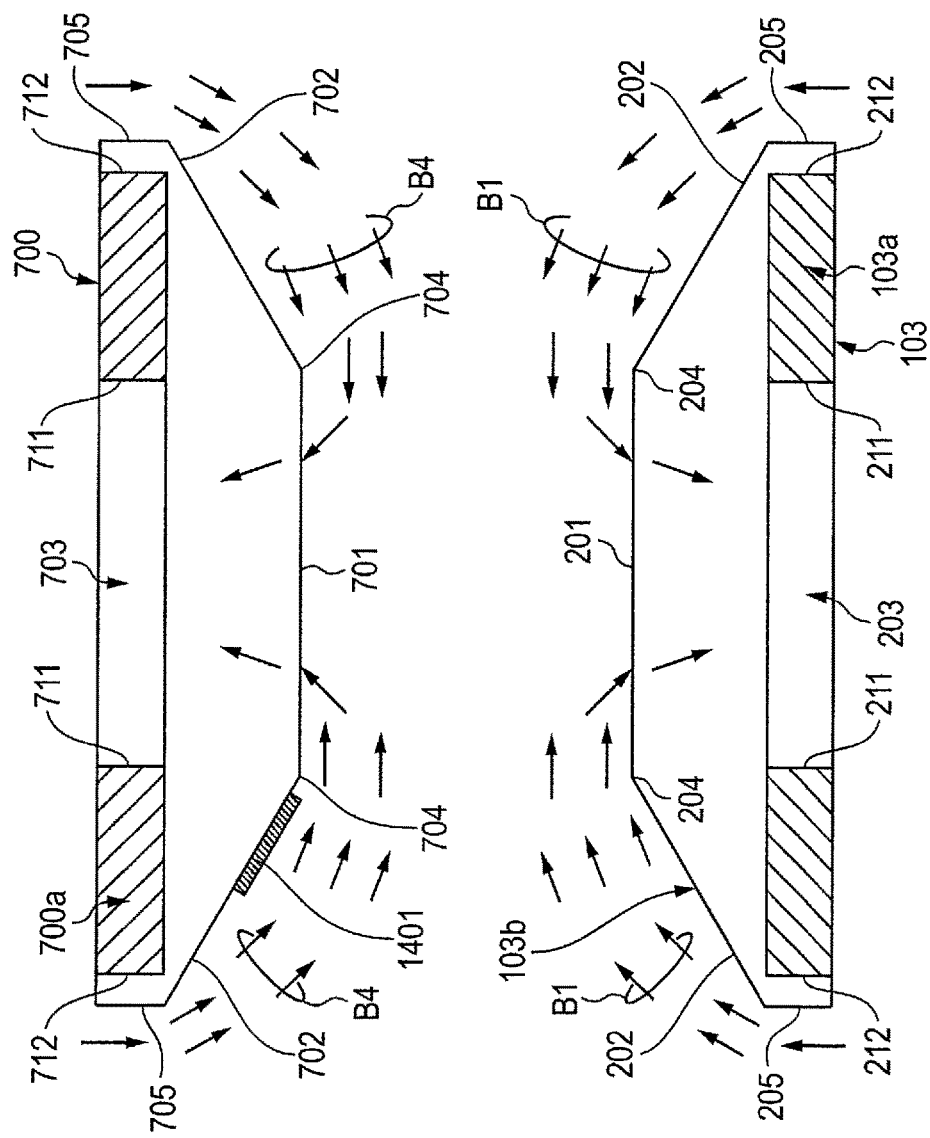
FIG. 14 is a view illustrating the state of a magnetic flux generated from an electricity supply coil of Embodiment 5 of the present invention.

FIG. 14 is a diagram illustrating how a magnetic flux is generated from electricity supply coil 103a and electricity reception coil 700a of the embodiment.

As illustrated in FIGS. 13 and 14, there is a need to cause electricity supply section 103 and electricity reception section 700 to approach each other in order to improve the power supply efficiency. When electricity supply section 103 and electricity reception section 700 approach each other, foreign object 1401 is sandwiched between casing 103b of electricity supply section 103 and casing 700b of electricity reception section 700, and hence there is a possibility that foreign object 1401 may stuck onto inclined portion 702 of casing 700b.

In this case, in the embodiment, since electricity reception section 700 is provided with inclined portion 702, foreign object 1401 existing on inclined portion 702 is inclined with respect to the radial direction of electricity reception coil 700a. Accordingly, since the number of magnetic flux lines B4 penetrating foreign object 1401 decreases as illustrated in FIG. 14, it is possible to prevent foreign object 1401 from being heated to a high temperature.

<Design of Casing>

Figure 15:
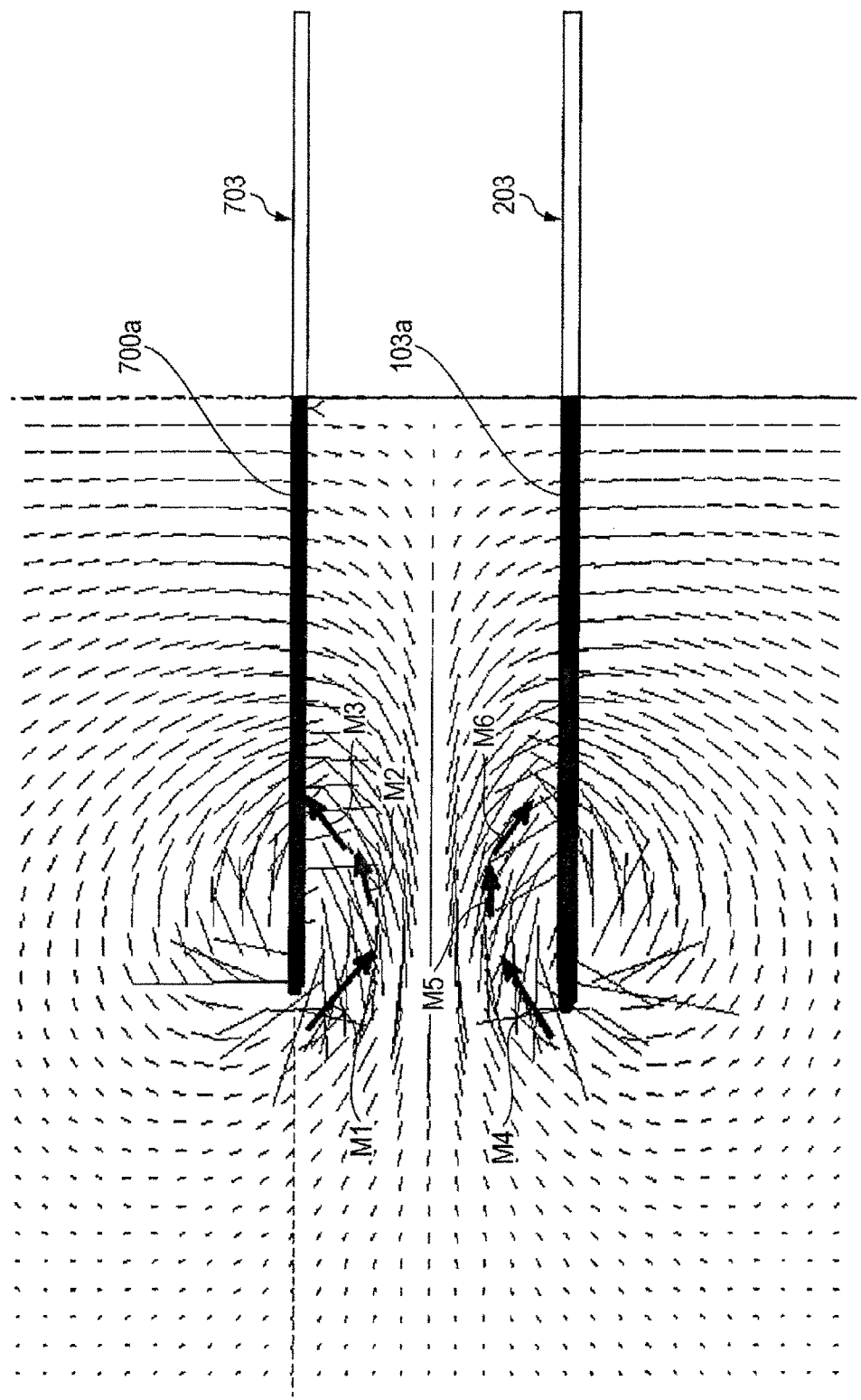
FIG. 15 is a view illustrating the distribution of a magnetic flux which can be generated around the electricity supply coil and an electricity reception coil of Embodiment 5 of the present invention.

FIG. 15 is a diagram illustrating the distribution of a magnetic flux which can be generated around electricity supply coil 103a and electricity reception coil 700a of the embodiment. FIG. 15 illustrates a state where the magnetic field becomes strong as the length of the line indicating the magnetic flux becomes longer. Further, in FIG. 15, arrows M1, M2, M3, M4, M5, and M6 indicate the directions of the magnetic flux lines at the position where the magnetic field is strong on the side where the foreign object is loaded on the casing. Furthermore, although there is a position where the magnetic field is strong even on the side where the foreign object is not loaded on the casing in FIG. 15, the arrow on the side where the foreign object is not loaded on the casing is omitted in FIG. 15.

The inclination of inclined portion 202 of casing 103b is designed so that the number of the magnetic flux lines penetrating the foreign object on inclined portion 202 decreases. Further, the inclination of inclined portion 702 of casing 700b is designed so that the number of the magnetic flux lines penetrating the foreign object on inclined portion 702 decreases.

Specifically, it is possible to obtain the magnetic flux density distribution and the magnetic flux direction of each point inside the peripheral space of electricity supply coil 103a and electricity reception coil 700a by using Maxwell's equations based on a change in the distribution of the current flowing to electricity supply coil 103a and electricity reception coil 700a. That is, it is possible to obtain the distribution of the magnetic flux illustrated in FIG. 15. Above all, casing 103a with inclined portion 202 inclined along arrows M4, M5, and M6 is designed, and casing 700b with inclined portion 702 inclined along arrows M1, M2, and M3 is designed.

Furthermore, even in Embodiments 1 to 4, the electricity-supply-side casing is designed by the above-described method.

<Effect of Embodiment 5>

According to the embodiment, even when the electricity reception section and the electricity supply section approach each other in order to improve the electricity supply efficiency, the foreign object existing on the inclined portion formed in the electricity reception section is inclined with respect to the radial direction of the electricity reception coil. Accordingly, it is possible to prevent the foreign object from being heated to a high temperature even when the electricity supply section and the electricity reception section approach each other in order to improve the electricity supply efficiency in addition to the effect of Embodiment 1.

<Variation of Embodiment>

In the embodiment, the electricity supply section has the same configuration as FIGS. 2 and 3, but the present invention is not limited thereto. For example, the electricity supply section can employ the same configuration as any one of FIGS. 9 to 12. At this time, the inclined portion of the electricity reception section is provided at a position facing the inclined portion provided in the electricity supply section.

(Embodiment 6)

Figure 16:
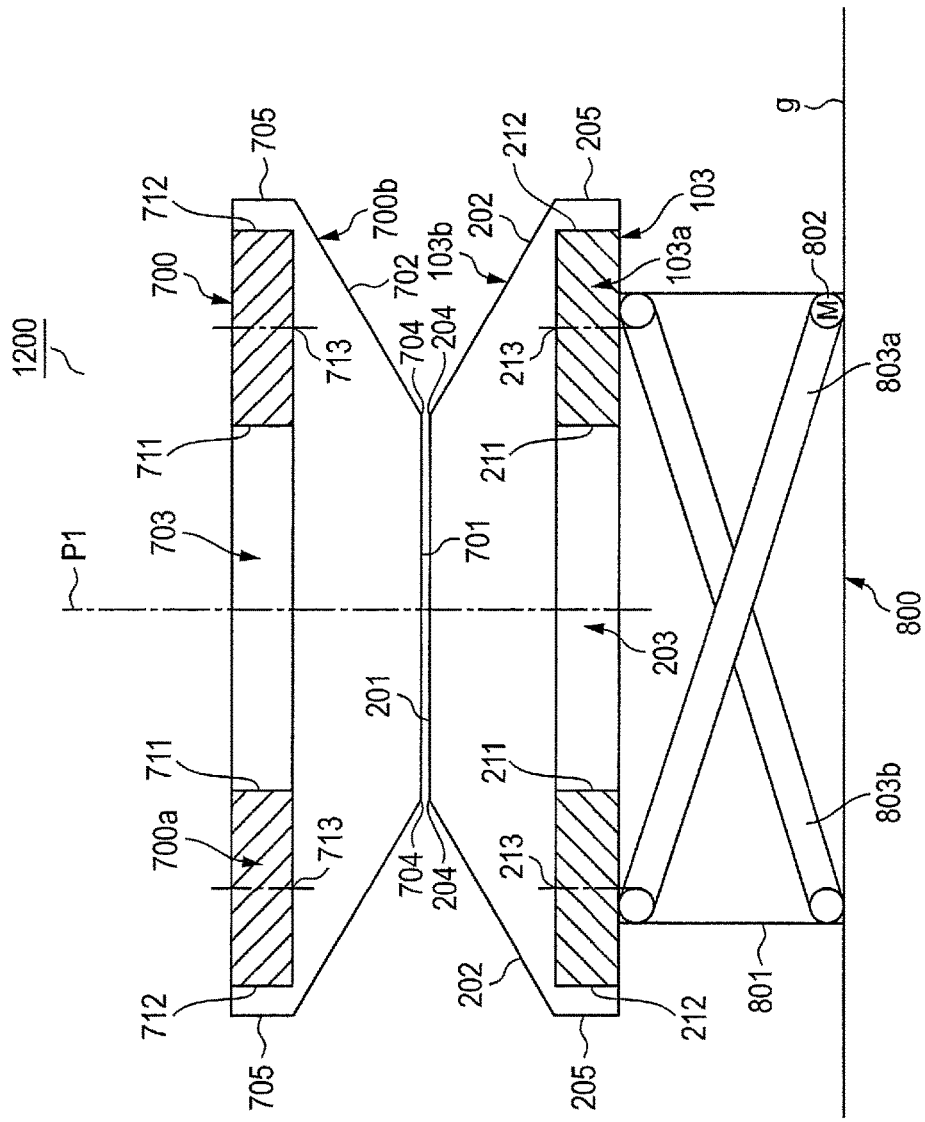
FIG. 16 is a view illustrating the configuration of a charging system according to Embodiment 6 of the present invention.

FIG. 16 is a diagram illustrating the configuration of charging system 1200 according to Embodiment 6 of the present invention. Furthermore, in FIG. 16, the same reference numerals will be given to the same components as those of FIGS. 2 and 13, and the description thereof will not be repeated. Further, since the reason that the radiation of heat of the foreign object is suppressed is the same as Embodiment 5, the description thereof will not be repeated. Further, since a charging system of the embodiment has the same configuration as FIG. 1 except that electricity reception section 700 is used instead of electricity reception section 153, the description thereof will not be repeated.

<Configuration of Movable Portion>

Movable portion 800 includes casing 801, motor 802, and support column portions 803a and 803b.

Casing 801 is installed on land surface g, and accommodates motor 802 and support column portions 803a and 803b. The ceiling surface of casing 801 contacts the bottom surface of electricity supply section 103.

Motor 802 moves support column portions 803a and 803b by receiving electricity from, for example, a general power supply.

Support column portion 803a is rotated by motor 802 in the clockwise direction so that electricity supply section 103 moves upward via casing 801. Support column portion 803a is rotated in the counter-clockwise direction by motor 802 so that electricity supply section 103 moves downward via casing 801.

Support column portion 803b is rotated in the counter-clockwise direction by the driving force of motor 802 so that electricity supply section 103 moves upward via casing 801. Support column portion 803b is rotated in the clockwise direction by the driving force of motor 802 so that electricity supply section 103 moves downward via casing 801.

<Operation of Electricity Supply Section and Movable Portion>

In the case where electricity is supplied from electricity supply section 103, movable portion 800 moves support column portions 803a and 803b by motor 802 so that electricity supply section 103 moves upward. Accordingly, electricity supply section 103 and electricity reception section 700 approach each other, and hence the electricity can be efficiently supplied.

At this time, there is a possibility that the foreign object sandwiched between inclined portion 202 of electricity supply section 103 and inclined portion 702 of electricity reception section 700 may be stuck to casing 700b. Thus, it is possible to prevent the foreign object sandwiched between inclined portion 202 and inclined portion 702 from being heated to a high temperature during the supply of electricity.

Meanwhile, movable portion 800 moves support column portions 803a and 803b by the driving force of motor 802 so that electricity supply section 103 moves downward after the supply of electricity by electricity supply section 103 ends. Accordingly, electricity supply section 103 and electricity reception section 700 are separated from each other, and hence vehicle 150 may be safely moved.

Furthermore, the electricity-reception-side casing and the electricity-supply-side casing can be designed by the method described in Embodiment 5.

<Effect of Embodiment 6>

According to the embodiment, since the electricity supply section is movable, it is possible to efficiently supply electricity and to safely move the vehicle after the supply of electricity ends by preventing the foreign object from being heated to a high temperature in addition to the effects of Embodiments 1 and 5.

<Variation of Embodiment>

In the embodiment, the electricity supply section has the same configuration as FIG. 2, but the present invention is not limited thereto. For example, the electricity supply section may have the same configuration as any one of FIGS. 8 to 10. At this time, the inclined portion of the electricity reception section is provided at the position facing the inclined portion provided in the electricity supply section.

<Variation Common to All Embodiments>

In Embodiments 1 to 6, the inclination angles of inclined portions 202, 402, 502, 602, and 702 can be set to optimal values. Hereinafter, the optimal value of the inclination angle of inclined portion 202 will be described.

In the case where electricity is supplied to electricity reception coil 153a of vehicle 150 in a non-contact state by using electromagnetic induction, the foreign object existing on casing 103b of electricity supply section 103 mainly corresponds to a metallic foreign object such as a coin, a pull-tab, or a clip having a size of about 2 cm by 2 cm.

Figure 17:
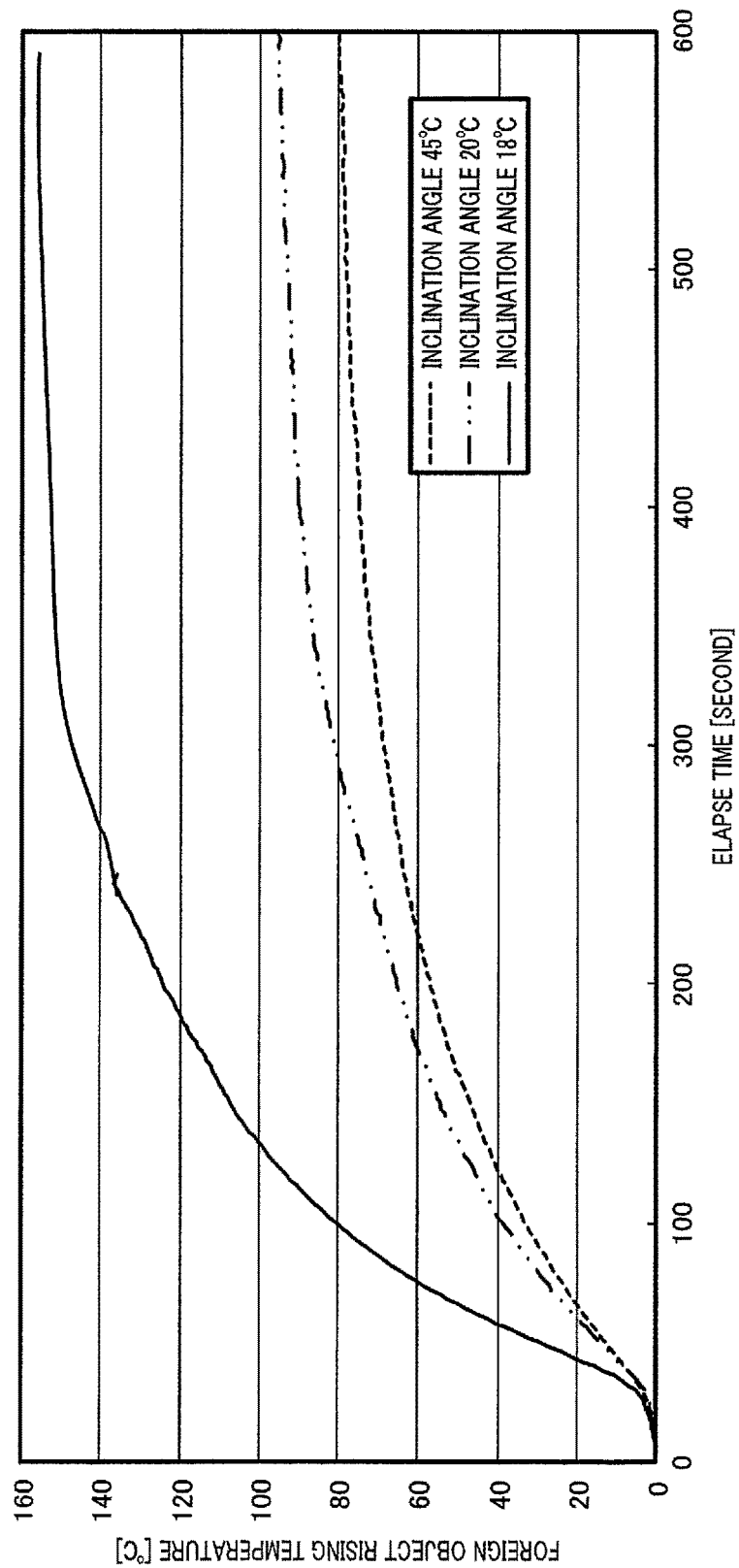
FIG. 17 is a diagram illustrating a relation between the inclination angle of the inclined portion and the foreign object rising temperature of Embodiments 1 to 6 of the present invention.

FIG. 17 is a diagram illustrating a relation between the raised temperature of the metallic foreign object and the elapse time in the case where the metallic foreign object having a size of 2 cm by 2 cm exists on casing 103b of electricity supply section 103. FIG. 17 illustrates the case where the inclination angle of inclined portion 202 is changed according to three patterns of 18 degrees, 20 degrees, and 45 degrees. Here, the inclination angle indicates the acute angle formed between inclined portion 202 and the plane perpendicular to center axis P1.

When a case is considered in which storage battery 154 of vehicle 150 is charged in a non-contact state, there is a high possibility that casing 103b of electricity supply section 103 be formed of resin based on the condition that the casing should not disturb the transmission of electricity and withstand the stepping load of vehicle 150. In the case of resin casing 103b, the heatproof temperature becomes about 240 degrees. When the heatproof temperature of casing 103b is set to 240 degrees, the peripheral environment temperature is set to 70 degrees at maximum, and the margin temperature is set to 20 degrees, the foreign object rising temperature is allowed to about 150 degrees.

Referring to FIG. 17, the foreign object rising temperature exceeds 150 degrees when the inclination angle is 18 degrees. On the contrary, the foreign object rising temperature does not exceed 150 degrees when the inclination angle is 20 degrees. When the inclination angle is 45 degrees, the foreign object rising temperature is further suppressed compared to the case where the inclination angle is 20 degrees.

As has been described above, the inclination angle is desirably set to 20 degrees or greater in order to limit the foreign object rising temperature within a specified temperature.

When the inclination angle of inclined portion 202 is set to 20 degrees or greater, casing 103b is formed in a conical shape and the thickness thereof in the height direction is thickened. As a result, there is a possibility that the casing may contact electricity reception section 153. For this reason, when the inclination angle of the inclined surface 202 is set to 20 degrees or greater, forming flat portion 201 in casing 103b is particularly effective in reduction of the thickness of casing 103b.

Furthermore, since the optimal value of the inclination angle can be set in the same way even in inclined portions 402, 502, 602, and 702 other than inclined portion 202, the description thereof will not be repeated.

Further, in Embodiments 1 to 6, the shape of the casing of the electricity supply section or the shape of the casing of the electricity reception section is formed as a shape in which an upper portion of a circular cone is cut out, but the present invention is not limited thereto. For example, a shape may be formed in which an upper portion of a polygonal cone is cut out.

Further, in Embodiments 1 to 6, the inclined portion is formed in a part of the portion facing the electricity reception section in the casing of the electricity supply section or a part of the portion facing the electricity supply section in the casing of the electricity reception section, but the present invention is not limited thereto. For example, the inclined portion may be formed in the entirety of the portion facing the electricity reception section in the casing of the electricity supply section or the entirety of the portion facing the electricity supply section in the casing of the electricity reception section. Since the inclined portion is formed in the entirety of the portion facing the electricity reception section in the casing of the electricity supply section or the entirety of the portion facing the electricity supply section in the casing of the electricity reception section, it is possible to reliably prevent the foreign object from being heated to a high temperature.

The disclosure of Japanese Patent Application No. 2012-57152, filed on Mar. 14, 2012, including the specification, drawings and abstract, is incorporated herein by reference in its entirety.

INDUSTRIAL APPLICABILITY

The electricity supply apparatus, the electricity reception apparatus, and the electricity supply system according to the present invention are suitable for use in supplying electricity in a contactless manner to an electricity reception section provided in a vehicle.

REFERENCE SIGNS LIST

103 Electricity supply section
103a Electricity supply coil
103b Casing
153 Electricity reception section
201 Flat portion
202 Inclined portion
203 Hollow portion
204 End
205 Side wall portion
211 Inner edge
212 Outer periphery
213 Middle portion

The invention claimed is:

1. An electricity supply apparatus that supplies electricity in a contactless manner to an electricity reception section provided in a vehicle, the apparatus comprising:
an electricity supply coil configured to supply electricity to an electricity reception coil of the electricity reception section, said electricity supply coil having a ring shape, an in-edge, an out-edge, and a middle point, the inn-edge being adjacent to a hollow portion of the ring shape in a radial direction of the electricity supply coil, the out-edge being outer than the inn-edge in the radial direction, and the middle point being between the inn-edge and the out-edge in the radial direction; and
a casing which houses the electricity supply coil, said casing having a first surface configured to face the electricity reception section and a second surface on which the electricity supply coil is located, wherein
the first surface has an inclined portion with a first region and a second region, the first region overlapping at least a part of an inner portion of the electricity supply coil in a center axis direction of the electricity supply coil, the inner portion being between the inn-edge and the middle point, the second region overlapping at least a part of an outer portion of the electricity supply coil in the center axis direction of the electricity supply coil, the outer portion being between the out-edge and the middle point, a first distance between the first region of the inclined portion of the first surface and the second surface being larger than a second distance between the second region of the inclined portion of the first surface and the second surface, wherein
when a foreign object having a flat surface is on the inclined portion with the flat surface in contact with the inclined portion, the inclined portion causes the flat surface of the foreign object to incline at one angle with respect to a radial direction of the electricity supply coil over the first region and the second region.

2. The electricity supply apparatus according to claim 1, wherein
the casing further includes a flat portion that intersects the center axis of the electricity supply coil and that is flat in the radial direction of the electricity supply coil, in addition to the inclined portion, wherein:
the flat portion is formed in at least a part of a first projection region formed when a hollow portion of the electricity supply coil is projected to the casing in the center axis direction of the electricity supply coil; and
the inclined portion is formed in at least a part of a second projection region formed when the electricity supply coil is projected to the casing in the center axis direction of the electricity supply coil.

3. The electricity supply apparatus according to claim 1, wherein the inclined portion is formed in such a way as to include a circle formed when a middle circle between an inner periphery and the outer periphery of the electricity supply coil is projected to the casing in the center axis direction of the electricity supply coil.

4. The electricity supply apparatus according to claim 1, wherein the inclined portion has an inclination angle of 20 degrees or greater.

5. The electricity supply apparatus according to claim 1, wherein the flat portion has a diameter that is larger than a diameter of a hollow portion of the electricity supply coil and that is smaller than a diameter of a middle circle between an inner periphery and the outer periphery of the electricity supply coil.

6. An electricity reception apparatus that is provided in a vehicle and that receives electricity from an electricity supply section in a contactless manner, the apparatus comprising:
an electricity reception coil configured to receive electricity from the electricity supply coil of the electricity supply section, said electricity reception coil having a ring shape, an in-edge, an out-edge, and a middle point, the inn-edge being adjacent to a hollow portion of the ring shape in a radial direction of the electricity reception coil, the out-edge being outer than the inn-edge in the radial direction, and the middle point being between the inn-edge and the out-edge in the radial direction; and
a casing which houses the electricity reception coil, said casing having a first surface configured to face the electricity supply section and a second surface on which the electricity reception coil is located, wherein
the first surface has an inclined portion with a first region and a second region, the first region overlapping at least a part of an inner portion of the electricity reception coil in a center axis direction of the electricity reception coil,
the inner portion being between the inn-edge and the middle point, the second region overlapping at least a part of an outer portion of the electricity reception coil in the center axis direction of the electricity reception coil, the outer portion being between the out-edge and the middle point, a first distance between the first region of the inclined portion of the first surface and the second surface being larger than a second distance between the second region of the inclined portion of the first surface and the second surface, wherein
when a foreign object having a flat surface is on the inclined portion with the flat surface in contact with the inclined portion, the inclined portion causes the flat surface of the foreign object to incline at one angle with respect to a radial direction of the electricity reception coil over the first region and the second region.

7. The electricity reception apparatus according to claim 6, wherein
the casing includes a flat portion that intersects the center axis of the electricity reception coil and that is flat in a radial direction of the electricity reception coil, in addition to the inclined portion, wherein:
the flat portion is formed in at least a part of a first projection region formed when a hollow portion of the electricity reception coil is projected to the casing in the center axis direction of the electricity reception coil; and the inclined portion is formed in at least a part of a second projection region formed when the electricity reception coil is projected to the casing in the center axis direction of the electricity reception coil.

8. The electricity reception apparatus according to claim 6, wherein the inclined portion is formed in such a way as to include a circle formed when a middle circle between an inner periphery and the outer periphery of the electricity reception coil is projected to the casing in the center axis direction of the electricity reception coil.

9. The electricity reception apparatus according to claim 6, wherein the inclined portion has an inclination angle of 20 degrees or greater.

10. The electricity reception apparatus according to claim 6, wherein the flat portion has a diameter that is larger than a diameter of a hollow portion of the electricity reception coil and that is smaller than a diameter of a middle circle between an inner periphery and the outer periphery of the electricity reception coil.

11. An electricity supply system comprising:
an electricity reception apparatus that is provided in a vehicle; and
an electricity supply apparatus that supplies electricity in a contactless manner to the electricity reception apparatus, wherein
the electricity reception apparatus includes:
a hollow ring-shaped electricity reception coil that receives electricity from an electricity supply coil of the electricity supply apparatus; and
an electricity-reception-side casing that houses the electricity reception coil, and
the electricity supply apparatus includes:
an electricity supply coil configured to supply electricity to the electricity reception coil of the electricity reception apparatus, said electricity supply coil having a ring shape, an in-edge, an out-edge, and a middle point, the inn-edge being adjacent to a hollow portion of the ring shape in a radial direction of the electricity supply coil, the out-edge being outer than the inn-edge in the radial direction, and the middle point being between the inn-edge and the out-edge in the radial direction; and
an electricity-supply-side casing which houses the electricity supply coil, said casing having a first surface configured to face the electricity reception section and a second surface on which the electricity supply coil is located, wherein:
the electricity-reception-side casing includes an electricity-reception-side inclined portion that inclines in such a way as to gradually approach the electricity reception coil toward an outer periphery of the electricity reception coil, wherein the electricity-reception-side inclined portion is formed in at least a part of a first projection region formed when the electricity reception coil is projected to the electricity-reception-side casing in a center axis direction of the electricity reception coil; and
the first surface has an electricity-supply-side inclined with a first region and a second region, the first region overlapping at least a part of an inner portion of the electricity supply coil in a center axis direction of the electricity supply coil,
the inner portion being between the inn-edge and the middle point, the second region overlapping at least a part of an outer portion of the electricity supply coil in the center axis direction of the electricity supply coil, the outer portion being between the out-edge and the middle point, a first distance between the first region of the inclined portion of the first surface and the second surface being larger than a second distance between the second region of the inclined portion of the first surface and the second surface, wherein
when a foreign object having a flat surface is on the inclined portion with the flat surface in contact with the inclined portion, the inclined portion causes the flat surface of the foreign object to incline at one angle with respect to a radial direction of the electricity supply coil over the first region and the second region.

12. The electricity supply system according to claim 11, wherein:
the electricity-reception-side casing includes an electricity-reception-side flat portion that intersects the center axis of the electricity reception coil and that is flat in a radial direction of the electricity reception coil, in addition to the electricity-reception-side inclined portion, wherein
the electricity-reception-side flat portion is formed in at least a part of a third projection region where a hollow portion of the electricity reception coil is projected to the electricity-reception-side casing in the center axis direction of the electricity reception coil; and
the electricity-supply-side casing includes an electricity-supply-side flat portion that intersects the center axis of the electricity supply coil and is flat in a radial direction of the electricity supply coil, in addition to the electricity-supply-side inclined portion, wherein
the electricity-supply-side flat portion is formed in at least a part of a fourth projection region where a hollow portion of the electricity supply coil is projected to the electricity-supply-side casing in the center axis direction of the electricity supply coil.

* * * * *